United States Patent
Akao

[19]

[11] Patent Number: 5,883,484
[45] Date of Patent: Mar. 16, 1999

[54] CONTROLLER FOR DRIVING A PERMANENT MAGNET TYPE SYNCHRONOUS MOTOR

[75] Inventor: Norihiko Akao, Nagoya, Japan

[73] Assignee: Toyota Jidosha Kabushiki Kaisha, Toyota, Japan

[21] Appl. No.: 870,391

[22] Filed: Jun. 6, 1997

[30] Foreign Application Priority Data

Aug. 22, 1996 [JP] Japan ................................. 8-221170

[51] Int. Cl.$^6$ ............................ H02P 21/00; B60L 15/20
[52] U.S. Cl. ............................ 318/700; 318/139; 318/432
[58] Field of Search .................... 318/139, 254, 318/432, 433, 440, 442, 500, 690, 700, 701

[56] References Cited

U.S. PATENT DOCUMENTS

| | | | |
|---|---|---|---|
| 4,297,625 | 10/1981 | Newwll | 318/696 |
| 4,538,100 | 8/1985 | Tuten et al. | 318/808 |
| 4,870,332 | 9/1989 | Coghran et al. | 318/254 |
| 5,246,479 | 9/1993 | Gami et al. | 360/73.03 |
| 5,569,995 | 10/1996 | Kusaka et al. | 318/717 |

FOREIGN PATENT DOCUMENTS

| | | |
|---|---|---|
| 0 638 457 | 2/1995 | European Pat. Off. . |
| 7-107772 | 4/1995 | Japan . |

OTHER PUBLICATIONS

W. Juettner, et al., ETZ Elektrotechnische Zeitschrift, vol. 115, No. 15, pp. 852 to 854, 856 and 857, "Permanentmagneterregte Synchronmaschine ALS Traktionsmotor", Aug. 1994, (with English translation).

J. Jelonkiewicz, et al., EPE 95: 6th. European Conference on Power Electronics and Application, vol. 2, No. 6, pp. 2.895 to 2.900, "Comparative Study of drives for battery powered Light Vehicles", Sep. 19 to 21, 1995.

Patent Abstracts of Japan, vol. 096, No. 012, Dec. 26, 1996, JP 08-214592, Aug. 20, 1996.

Primary Examiner—Bentsu Ro
Attorney, Agent, or Firm—Oblon, Spivak, McClelland, Maier & Neustadt, P.C.

[57] ABSTRACT

A controller for driving permanent magnet type synchronous motor. A motor terminal voltage or IPM (intelligent power module) input voltage necessary to achieve a target operating point is computed based on torque command and motor revolution. When the computed voltage exceeds an actual battery voltage, a booster is inserted between the battery and IPM, and the battery voltage, after being boosted, is applied between the direct current terminals of the IPM. Since the motor terminal voltage can be made so as to not exceed the boosted voltage even if the motor terminal voltage rises along with a rise in revolution and speed voltage, field weakening control becomes unnecessary.

4 Claims, 6 Drawing Sheets

CONTROLLER FOR DRIVING A PERMANENT MAGNET TYPE SYNCHRONOUS MOTOR

BACKGROUND OF THE INVENTION

1. Field of the Invention

The present invention relates to a controller for driving a permanent magnet type synchronous motor (hereinafter referred to as a PM motor).

2. Description of the Related Art

There is a strong demand for the miniaturization of vehicle driving motors for electric vehicles. A PM motor is a type of motor that uses permanent magnets as a generating means for excitation magnetic flux and is characterized by having a large field magnetomotive force per unit volume. Therefore, since the PM motor is easier to miniaturize than other types of motors, various electric vehicles using the PM motor as the driving motor have heretofore been proposed.

Vector control is widely used as a method for controlling the vehicle driving motors of electric vehicles. Vector control is a method where target control is performed by separating the motor current IM into a torque current component Iq and a field current component Id. Of these components, Iq generates a torque (magnet torque) from an interaction with the main flux, namely, the excitation magnetic flux obtained at the permanent magnet. Id generates the excitation magnetic flux that partially strengthens or weakens the main flux. If the motor has pole saliency, Id also generates a torque (reluctance torque) proportional to Id•Iq.

When using vector control in a system having a battery for a power supply, such as an electric vehicle, the following problems arise. First, within the motor, the main flux E0 interacts with the winding at a rotor angular velocity ω of the motor. A voltage induced in the winding by this interaction is called a speed voltage. The speed voltage is an electromotive force that is directly proportional to the rotor angular velocity ω of the motor and can be expressed as ω•E0. Therefore, as the rotor angular velocity ω of the motor rises, the speed voltage ω•E0 also rises. As the speed voltage ω•E0 rises, the voltage across the ends of the winding rises, and in turn the terminal voltage of the motor rises. If the terminal voltage rises significantly so as to exceed a value corresponding to a battery voltage VB, which is the supply voltage, it can be appreciated that a load is placed on the circuitry and electrical components located between the motor terminals and the battery. To avoid this load, the rotor angular velocity ω or the revolution N of the motor must be limited so that the terminal voltage of the motor does not exceed the value corresponding to the battery voltage. This sort of limitation on the operable revolution range is, in other words, an upper limit on the speed range that can be attained in an electric vehicle.

A method called field weakening control has been the most widely used method to solve this sort of problem and is presently handled partially using vector control. Field weakening control is a method for generating the excitation magnetic flux in a direction that weakens main flux E0 through control of Id when rotor angular velocity ω of the motor is high, and for further extending the operable region of the motor to the field weakening range at the high revolution side (refer to FIG. 6). Using this method, a high revolution region can be covered even for a motor with a relatively small output. Vector control also includes a mode based on an absolute value and torque angle, which is equivalent to the mode based on Id and Iq, so no distinction is made between them in this application.

Although field weakening control features this sort of advantage, it also results in a drop in efficiency. First, field weakening control increases the absolute value of Id at high revolutions. As mentioned earlier, Id is a current component that contributes little or nothing to torque generation. Thus, if Id (hereinafter referred to as a field weakening current) is excessively large when field weakening control is performed, loss increases. Conversely, if the field weakening current is excessively small, it hinders the achievement of the original object of the field weakening. In other words, the circuitry and electrical components provided between the motor terminals and battery, such as a power converter for motor output control, is subjected to stress so that the required Iq cannot be output. As a method to resolve these problems, the assignee for the present invention has previously proposed a method for varying the value of the field weakening current according to VB (refer to Japanese Patent Laid-Open Publication No. Hei 7-107772). According to this method, the loss generated in field weakening control can be minimized and optimized in the relationship with the voltage or the state of charge of the battery. However, as long as field weakening control is performed, the generation of loss caused by the field weakening current and the resulting drop in system efficiency cannot be eliminated.

SUMMARY OF THE INVENTION

An object of the present invention is to render field weakening control unnecessary by newly employing a method to boost battery voltage so as to achieve an improvement in system efficiency. Another object of the present invention is to maintain an operable speed range for the PM motor at or beyond the conventional range by performing booster control in accordance with the position of the target operating point of the PM motor. Another object of the present invention is to suppress the of loss in the booster so as to further improve system efficiency by not performing boosting when the battery voltage is low. Another object of the present invention is to achieve a more automatic system by providing a means for autonomously bypassing the booster. Another object of the present invention is to permit bypassing of the booster, for instance when it becomes necessary for regenerative braking, by providing means to forcibly bypass the booster. Another object of the present invention is to obviate an inrush prevention circuit through the use of the booster.

A driving controller, which is assumed in this invention, employs a power converter which is connected between a battery and a PM motor for converting VB to IM in order to control the PM motor. A preferred embodiment of this invention includes a booster, judgment means, and output region extension means. The booster boosts VB before it is supplied to the power converter and in accordance to a command. The judgment means determines, based on the detected value of VB, whether or not the target operating point of the PM motor is within the output region. If the target operating point is judged to be outside the output region by the judgment means, the output region extension means extends the output region so that the target operating point is within the output region by issuing a command to the booster in accordance with the position of the target operating point. In this embodiment, for example, VB is boosted so that the target operating point is included in the output region when the target operating point of the PM motor is located more towards the high revolution side of the output region under the present VB. Therefore, in the method of this invention where the generation or increase of Id is prevented, the occurrence of loss caused by Id and the resulting drop in system efficiency can be obviated. Since the method of this invention has the same type of field weakening control with respect to extension of the power driving region, the operable speed range of the PM motor can be maintained at or beyond the conventional range.

This invention is not limited to configurations that always use a booster, and also covers, for example, configurations that bypass the booster when boost is not performed or regenerative braking is performed. For example, an autonomous gate element (such as a diode) for forming or interrupting a conduction path, which does not go through the booster, in accordance with a voltage difference before and after the booster may be provided between the battery and power converter. This makes it possible to bypass the booster with the autonomous gate element when it is not necessary to perform boost. In other words, boost is not performed when VB is low so that the generation of loss in the booster is prevented and the system efficiency can be further improved. Furthermore, since the bypass formation and interruption is performed autonomously, namely, automatically by the autonomous gate element, a control apparatus or procedure for this purpose is unnecessary. Alternatively, a controllable gate element (such as a thyristor) for forming or interrupting the conduction path between the battery and power converter and which does not go through the booster according to a command, and a means for supplying a command to the controllable gate element when the target operating point is on the regeneration side so as to forcibly form the conduction path may be provided, to enable the booster to be bypassed as necessary, such as for regenerative braking.

This invention is not limited to configurations that use the booster only for boosting, and also covers, for example, configurations that perform formation of regeneration path with the booster. For example, a circuit is used for the booster comprising a passive element (such as a boost reactor) for storing the energy discharged from the battery, and an active element (such as a transistor) for selectively connecting the passive element to one of the positive and negative input terminals of the power converter according to a command. In this manner, these elements can be used in the formation of the path during regeneration. Furthermore, the inrush prevention circuit, namely, a circuit for preventing current due to the charging of the smoothing capacitor generally provided between the direct current terminals of the power converter can be obviated by the use of these elements. For example, by issuing the command to the above-mentioned active element in accordance with the result of the judgment at the judgment means and with the position of the target operating point when the target operating point is on the power driving side and by issuing the command so that a current path through the above-mentioned passive element is formed between the above-mentioned battery and above-mentioned power converter when the target operating point is in the regeneration side and/or when the permanent magnet type synchronous motor is to be started.

This invention is not limited to inventions relating to driving controllers and can be also presented as driving control methods, driving apparatus, driving methods, power supply apparatus, power supply methods, and so forth. Furthermore, although the application to a pure EV is hypothesized in the description herein, this invention is applicable to various applications, whether for industrial-use or consumer-use, in addition to electric locomotives and socalled hybrid vehicles. The permanent magnet type synchronous motor, which is the control object, is not limited to threephase alternating current motors or to the type using the reactance torque. Furthermore, although a configuration has been described below where the output torque of the motor is placed under open loop control based on the detected revolution, this invention is also applicable to configurations where the control of revolutions (speed control) is performed instead of the control of output torque (torque control), to configurations where closed loop control is performed instead of open loop control, as well as to configurations where control is performed based on predicted revolution instead of detected revolution. In addition, although the operating point of the motor was chiefly represented in a torque-revolution space, it may be represented in another type of space such as a motor voltage-current space. Although an example was given where the battery voltage is boosted so as to exceed the counter electromotive force of the motor, the battery voltage may be dropped in one part of a high voltage region. Furthermore, although an example was given where voltage boosting (or dropping) is not performed during regeneration, it may be performed by using switching elements within the IPM, for example. Various modifications are possible in specific configurations of the voltage boosting or dropping circuit. Firstly, by using a circuit featuring both voltage boosting and dropping, the element, such as a switch, diode, or thyristor, for bypassing the booster can be obviated. Secondly, instead of a parallel circuit of diode and thyristor in the first embodiment described below, an element, such as a bi-directional thyristor, may be used. Although details regarding the operation of the booster were omitted, the operation is widely known to those skilled in the art. Modifications to the embodiments described below, in particular those relating to the ones given here, can be easily implemented by anyone skilled in the art according to the disclosure of this application.

DETAILED DESCRIPTION OF THE PREFERRED EMBODIMENTS

A preferred embodiment of the present invention is described below with reference to the drawings.

Figure 1:
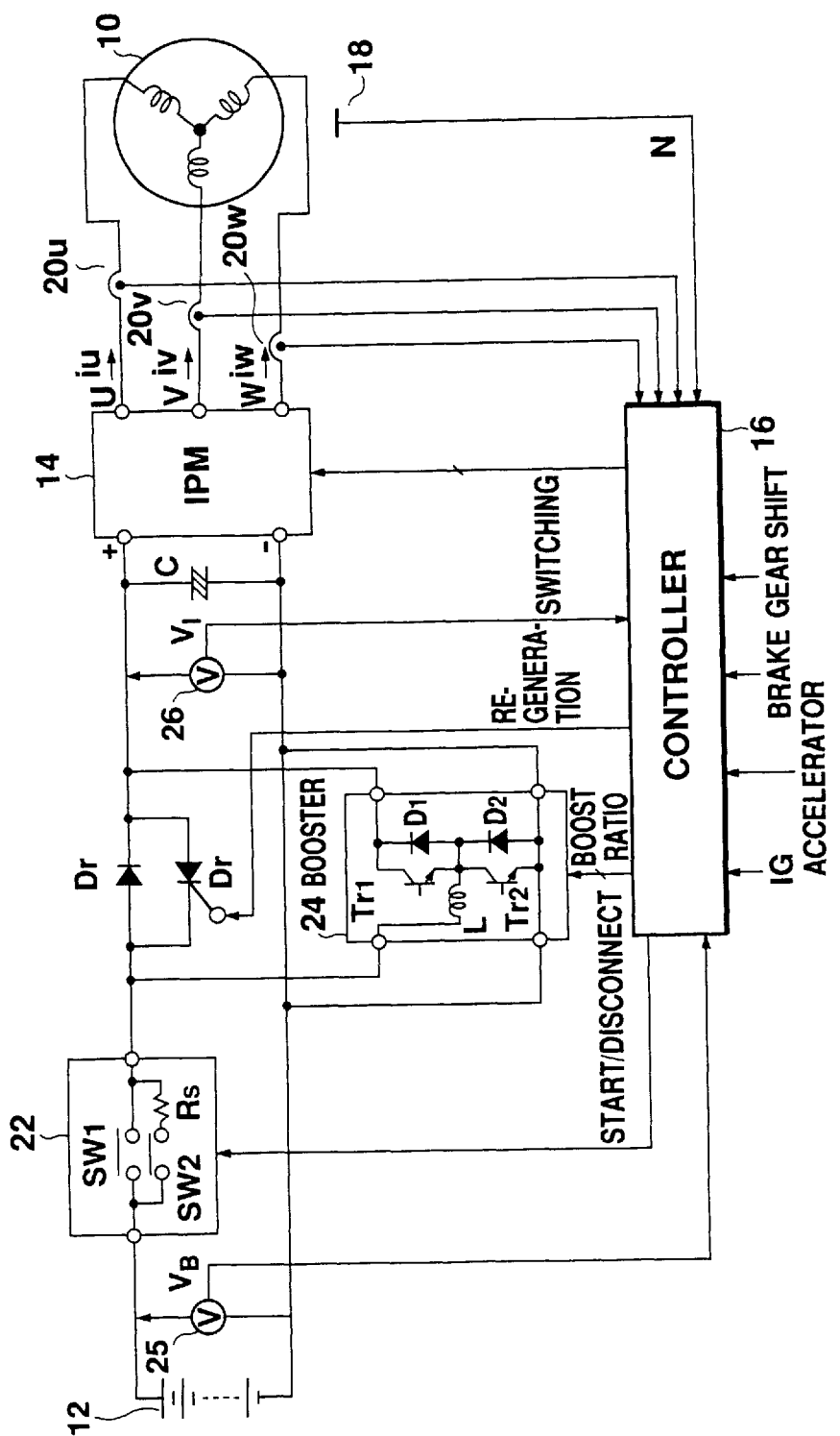
FIG. 1 is a system block diagram of an electric vehicle according to the first embodiment of this invention.

FIG. 1 shows a system configuration of an electric vehicle relating to an embodiment of the present invention. In this embodiment, a three-phase PM motor 10 is used as a vehicle driving motor. The driving power of motor 10 is supplied from a battery 12 through an intelligent power module (IPM) 14. In other words, the power discharged from the battery 12, after being smoothed by a smoothing capacitor C, is converted by IPM 14 from direct current to a three-phase alternating current, and the resulting currents iu, iv, and iw are supplied to the individual windings of motor 10.

The output torque of motor 10 is controlled by a controller 16 by generating switching signals in accordance with pedal or lever operations of the accelerator, brake, gear shift, and so forth by the vehicle operator, and in accordance with the revolutions (or rotor angular position) of motor 10 detected by a rotation sensor 18, such as a resolver, and controlling the switching pattern of switching elements in the IPM 14. By executing this sort of control, the motor 10 can output the torque requested from the vehicle operator by operation of the accelerator etc. To perform this control, respective phase currents iu, iv, and iw of motor 10 are detected by current sensors 20u, 20v, and 20w, which are provided to correspond to the various windings of motor 10, and fed back to controller 16.

Furthermore, an inrush prevention circuit 22, a diode Df, a thyristor Dr, and a booster 24 are provided between battery 12 and IPM 14. Among these, inrush prevention circuit 22 suppresses or prevents the inrush current that flows due to the charging of smoothing capacitor C immediately after battery 12 is connected to IPM 14, and comprises two switches SW1 and SW2, which are connected in parallel and which turn on and off in accordance with the operation of ignition (IG), and resistor Rs, which is connected in series with switch SW2. Furthermore, booster 24, which represents one characteristic of this invention, boosts terminal voltage VB of battery 12 to a higher voltage VI under control of controller 16 and applies VI to the direct current terminals of IPM 14. Diode Df is provided to bypass booster 24 when a large potential difference is not being generated between the input and output terminals of booster 24, namely, when the booster 24 is not performing the boost operation. Thyristor Dr turns on and off according to a signal supplied from controller 16 and thereby generates a current path of a direction opposite to that determined by diode Df. Drawing reference numerals 25 and 26 represent voltage sensors for detecting VB and VI, respectively. One compositional example of booster 24 shows two transistors Tr1 and Tr2 connected in series between the direct current terminals of IPM 14 along the forward direction relative to VI, diodes D1 and D2 connected in parallel to these transistors along the reverse direction relative to VI, and a boost reactor L of which one end is connected to the connection point between transistors Tr1 and Tr2 and the other end is connected to the battery 12 side.

Figure 2:
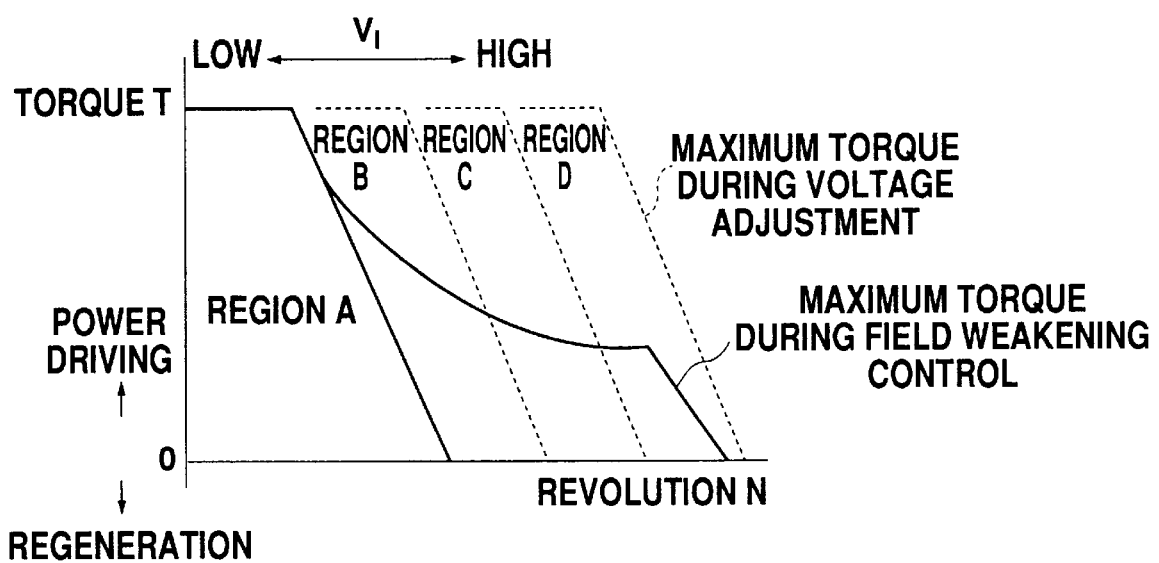
FIG. 2 is a torque-revolution space diagram showing a principle of output region extension and system efficiency improvement according to this embodiment.
Figure 6:
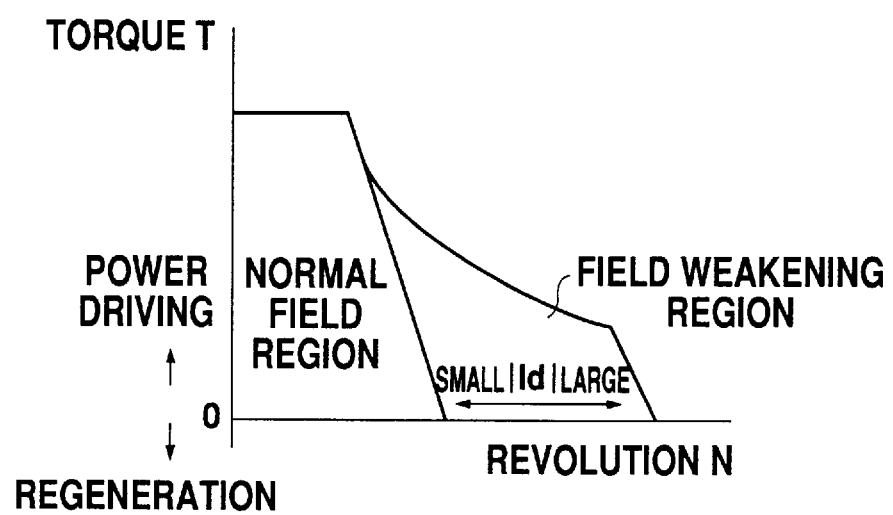
FIG. 6 is a torque revolution space diagram illustrating field weakening control of the prior art.

FIG. 2 illustrates the principle of output region extension of the motor 10 in this embodiment. The region indicated by region A in this figure is equivalent to the region indicated by the normal field region in FIG. 6. Heretofore, the output region of motor 10 was extended for characteristics indicated by the solid line in FIG. 2, namely, until the region indicated by the field weakening region in FIG. 6, by increasing field weakening current Id in accordance with the rise of motor revolution N. In this embodiment in contrast, independent of the control of Id, the output region of motor 10 is extended by control of booster 24. In other words, when the present target operating point (T,N) is located on the high revolution side from the region that can be achieved with the present VB or VI, the boost ratio by booster 24 in this embodiment is increased so that the output region of motor 10 broadens, in such a manner as from region A to B, from B to C, and further from C to D. Since the control of Id is not necessary to broaden the output region based on this principle, a reduction in system efficiency due to the conventional field weakening control does not occur.

Figure 3:
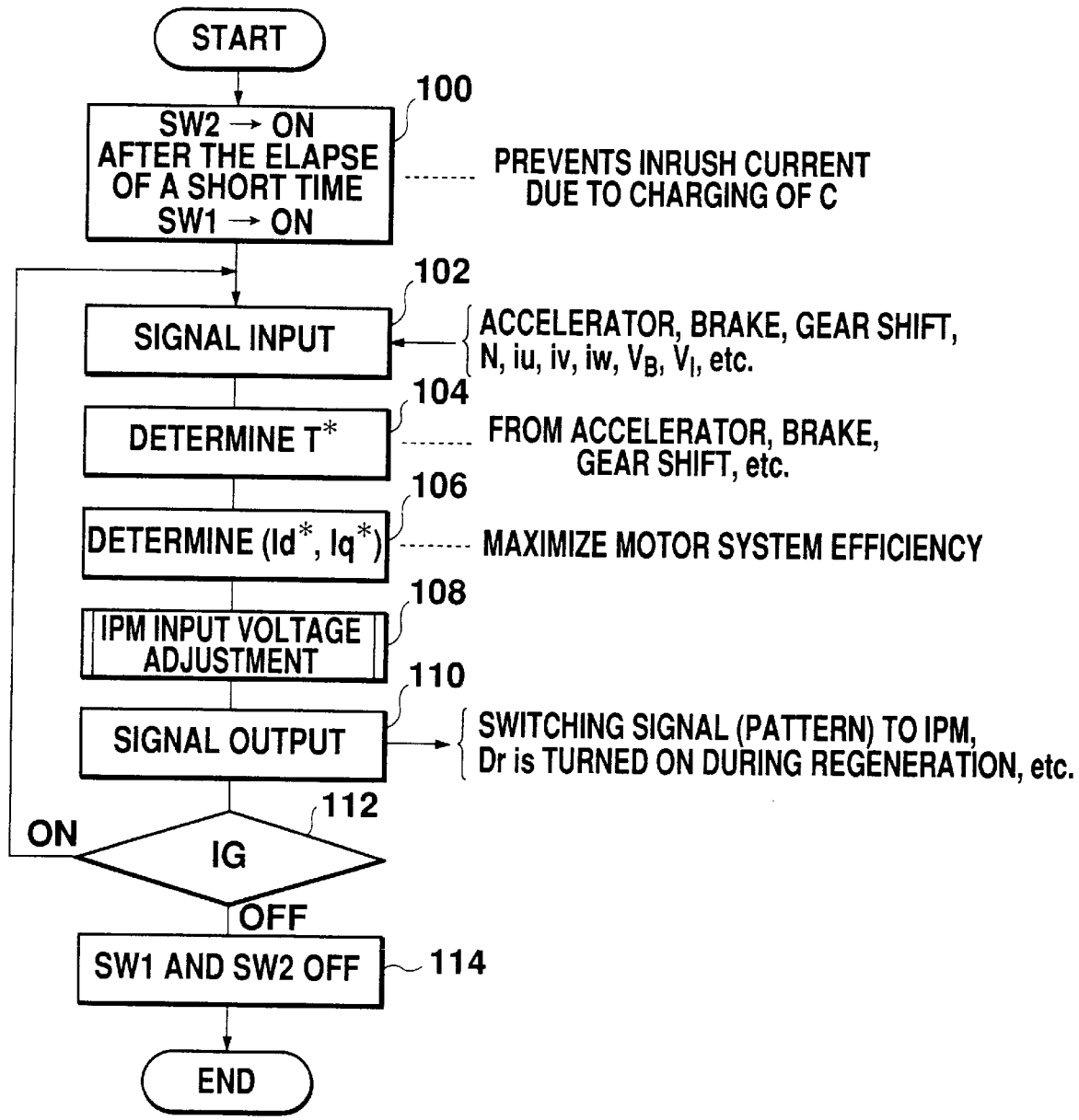
FIG. 3 is a flow chart showing the flow of operation of a controller according to this embodiment.
Figure 4:
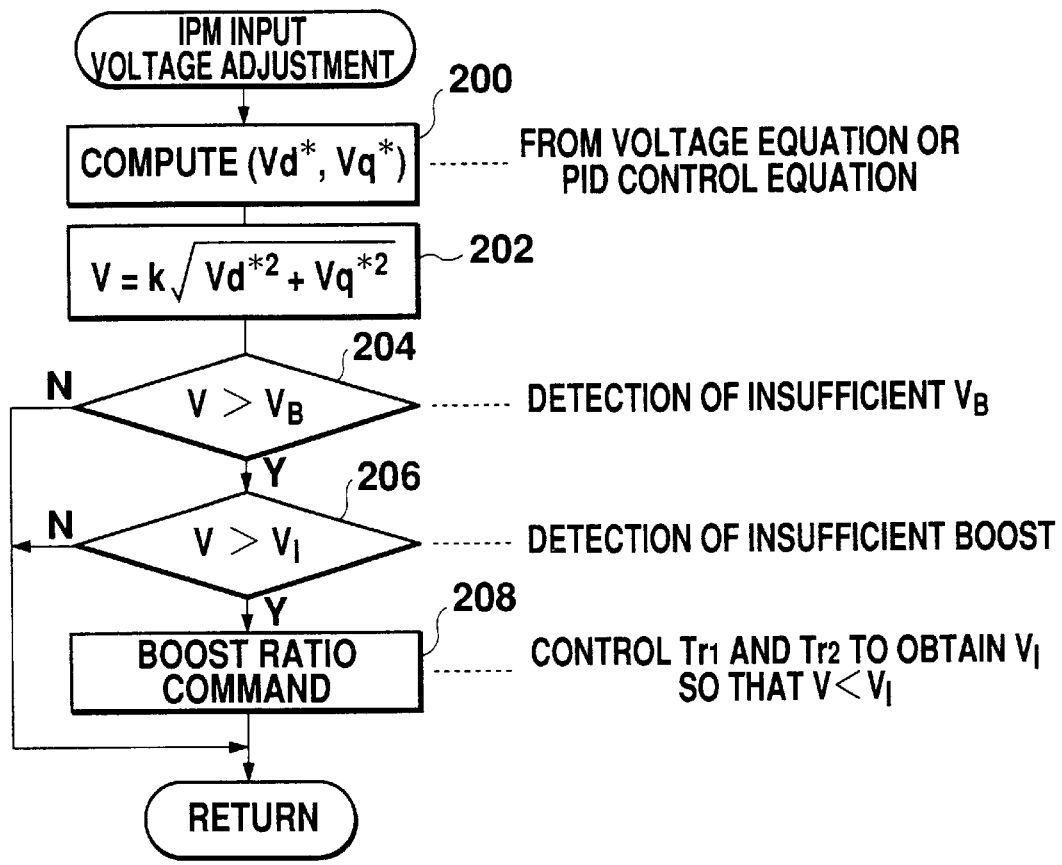
FIG. 4 is a flow chart showing the flow of operation of a controller according to this embodiment.

An example of procedures to be executed by controller 16 in order to implement this sort of principle is shown in FIGS. 3 and 4. First, as shown in FIG. 3, controller 16 turns on switch SW2 in inrush prevention circuit 22 immediately after IG is turned on, and after a short period of time turns on switch SW1 (100). In other words, for a short period of time immediately after IG is turned on, smoothing capacitor C is charged through resistor Rs as a charging resistance, and at a point where smoothing capacitor C is considered to be sufficiently charged, SW1 is turned on and both ends of resistor Rs are shorted. Thereafter, the operation of controller 16 transfers to a series of repetitive procedures for the output torque control of motor 10.

When controlling the output torque of motor 10, controller 16 first inputs signals (102) from various parts of the vehicle. For example, accelerator angle, braking force, position of gear shift lever, motor revolution N, motor currents iu, iv, and iw, battery voltage VB, IPM input voltage VI, and so forth are input. Thereafter, controller 16 determines a reference torque T* (104), namely a target value of torque to be output from motor 10, based on the information of accelerator angle, braking force, gear shift lever position, motor revolution N, and so forth. Controller 16 determines a reference current (Id*,Iq*) based on reference torque T* specified in this manner and so that the system efficiency of motor 10 is maximized. Of the reference current mentioned here, Id* is a command relating to field current component Id, and Iq* is a command relating to torque current component Iq. Controller 16 uses the reference current (Id*,Iq*) determined in this manner to perform adjustment of IPM input voltage VI (108), then outputs signals (110), to the IPM 14, for example.

In other words, a signal signifying a switching pattern for IPM 14 is output so that currents iu, iv, and iw flow in accordance with the reference current (Id*,Iq*), and, when reference torque T* is in the regeneration region (region in FIG. 2 where T<0), a turn-on command is supplied to thyristor Dr. The operations in steps 102 to 110 above are repeated (112) until IG is turned off by the vehicle operator. When IG turns off, controller 16 turns off switches SW1 and SW2 at an appropriate point of time (114) and thereby interrupts the supply of power from battery 12 to motor 10.

The adjustment of the IPM input voltage shown in step 108 is executed in the procedure shown in FIG. 4. In other words, controller 16 computes (200) (Vd*, Vq*), for example, according to the following equation:

$$Vd=(R+pLd) \cdot Id^* - \omega \cdot Lq \cdot Iq^*$$

$$Vq=\omega \cdot Ld \cdot Id^* + (R+pLq) \cdot Iq^* + \omega \cdot E0$$

where

R: resistance of motor winding

Ld, Lq: d axis and q axis inductances of motor winding $\omega$: motor electrical angular velocity E0: speed voltage (electromotive force by permanent magnet)

p: differential operator

Or, instead of this, (Vd*,Vq*) may be determined according to the following equation:

$$Vd=Kp \cdot \Delta Id + Ki \cdot \int \Delta Id - \omega \cdot Lq \cdot Iq$$

$$Vq=Kp \cdot \Delta Iq + Ki \cdot \int \Delta Iq + \omega \cdot Ld \cdot Id + \omega E0$$

where $\Delta Id = Id^* - Id$ $\Delta Iq = Iq^* - Iq$ (Vd*, Vq*) obtained in this manner indicates a voltage necessary to achieve reference torque T* or reference current (Id*,Iq*). Controller 16 further determines voltage V according to the following equation:

$$V = k \cdot (Vd^2 + Vq^2)^{1/2}$$

where k is a coefficient for converting the motor terminal voltage into the IPM input voltage. Voltage V obtained in this manner is the IPM input voltage required to achieve the target operating point for motor 10, namely, (T*,N). Controller 16 judges whether or not this voltage V exceeds VB (204) and VI (206). If the condition of V>VB is not satisfied, controller 16 transfers to step 110 without boosting by booster 24 since it is assumed that the target operating point (T*,N) can be achieved when the present battery voltage VB is applied substantially as VI to IPM 14 through diode Df. If the condition of V>VB is satisfied and booster 24 has not started operation, V>VI will surely be satisfied so that the operation of controller 16 transfers to step 208, namely, a command operation for the boost ratio for booster 24. In step 208, controller 16 initiates an operation to control transistors Tr1 and Tr2 so that VI, which satisfies V<VI, can be obtained.

Furthermore, even after the boost operation by booster 24 has started, there may be instances where the condition of V>VI is satisfied due to insufficient boost ratio, in which case (206) step 208 is also executed.

The above-mentioned control procedures in this embodiment secure the power driving region (in particular the speed range) and improve the motor system efficiency based on the principle shown in FIG. 2.

Figure 5:
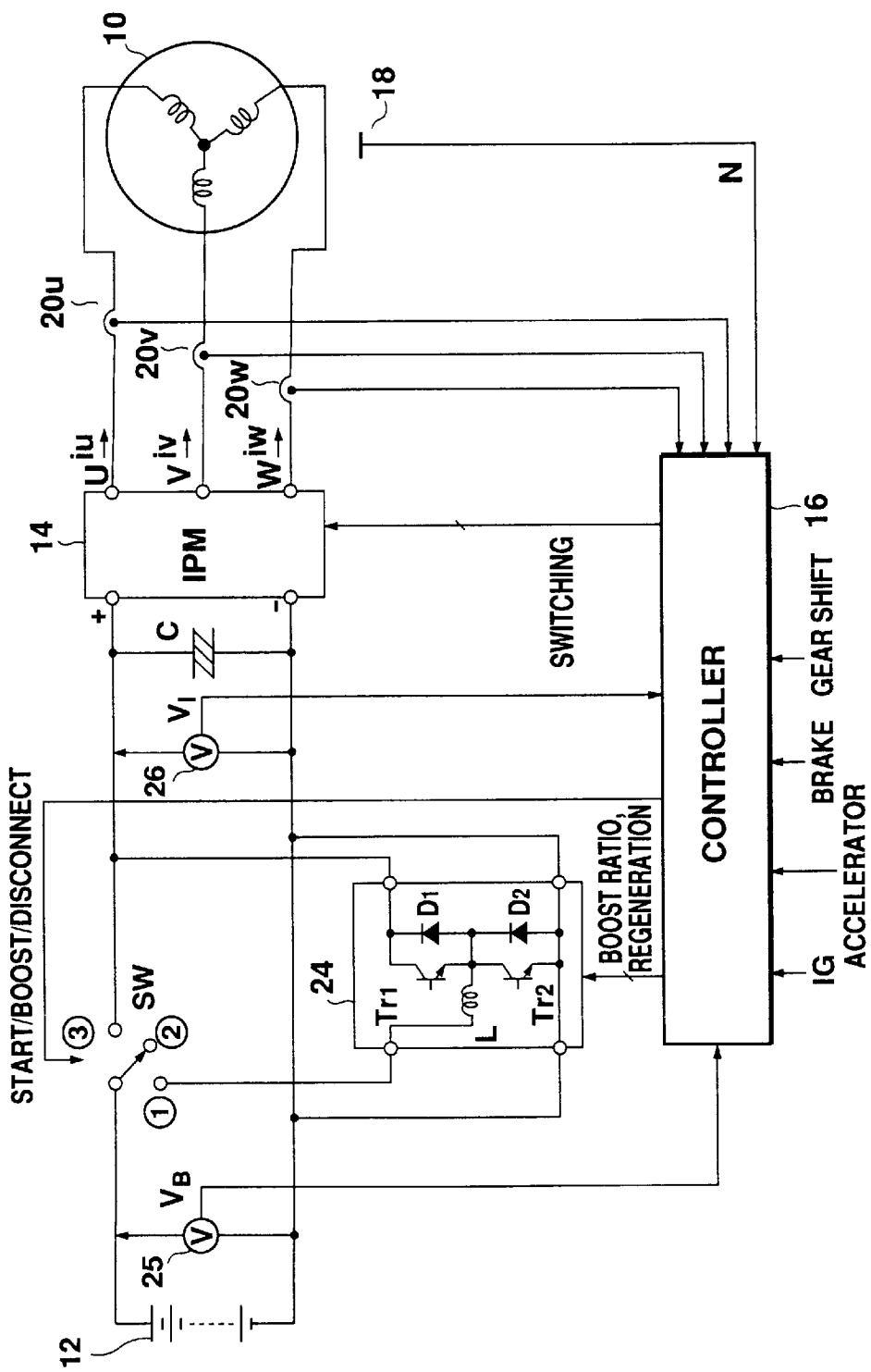
FIG. 5 is a system block diagram of an electric vehicle according to a second embodiment of this invention.

FIG. 5 shows a system configuration of an electric vehicle related to a second embodiment of the present invention. In this embodiment, instead of inrush prevention circuit 22, a switch SW is used to switch battery 12 to IPM 14 or booster 24, and diode Df and thyristor Dr have been obviated. Accompanying this, there is also a change in the procedures for operation of controller 16.

First, although the control to turn on switches SW1 and SW2 was performed with a time difference in step 100 of FIG. 3 in the above-mentioned embodiment, in this embodiment, switch SW is first switched to position 1 in step 100 and thereby battery 12 is connected to booster 24 having a built-in boost reactor L. Controller 16 turns on source-side transistor Tr1 and turns off sink-side transistor Tr2 to form a state where battery 12 is connected to IPM 14 through boost reactor L so that the charging of smoothing capacitor C through boost reactor L achieves a function identical to that of inrush prevention circuit 22 in the first embodiment. Furthermore, after the elapse of time where smoothing capacitor C has been considered to be sufficiently charged, controller 16 switches switch SW to position 3 so that battery 12 is connected to IPM 14.

Thereafter, as in the above-mentioned first embodiment, the procedures of steps 102 to 110 are repeatedly executed until vehicle operator turns off IG. However, when reference torque T* is in the regeneration region, instead of the control to turn on thyristor Dr, a control to turn on transistor Tr1 and turn off transistor Tr2 is performed. This sort of control forms a current path through boost reactor L similar to that immediately after IG is turned on so that braking energy to battery 12 can be regenerated. Alternatively, the braking energy can be regenerated by switching the switch SW to position 3. After IG has been turned off, controller 16 switches switch SW to position 2 to disconnect battery 12 from IPM 14 and from booster 24.

This sort of configuration and procedures enable the output region of motor 10 to be extended and the system efficiency to be improved as in the above-mentioned first embodiment. Furthermore, in this embodiment, the inrush prevention circuit and so forth can be obviated.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A driving controller for controlling a permanent magnet type synchronous motor using a power converter that is connected between a battery and the permanent magnet type synchronous motor and converts a battery voltage to a motor current; said driving controller comprising:

a booster for boosting said battery voltage before being supplied to said power converter according to a command;

judgment means for judging, based on a detected value of said battery voltage, whether or not a target operating point for said permanent magnet type synchronous motor is in an output range thereof; and extending means for extending, when it has been determined by the judgment means that the target operating point is not in the output range, said output range so as to cover the target operating point by issuing the command to said booster according to the location of said target operating point.

2. The driving controller according to claim 1 further comprising an autonomous gate element for forming or interrupting a conduction path in accordance with a difference in the voltages before and after the booster, the conduction path being provided between said battery and said power converter that does not pass through said booster;

whereby said booster is automatically bypassed by said autonomous gate element when boosting is not being performed.

3. The driving controller according to claim 1 further comprising:

a controllable gate element for forming or interrupting a conduction path in accordance with a gate command, the conduction path being provided between said battery and said power converter that does not pass through said booster; and means for providing the gate command to said controllable gate element to forcibly form said conduction path when said target operating point is on the regeneration side.

4. The driving controller according to claim 1 wherein:

said booster includes a passive element for storing the energy discharged from said battery and an active element for selectively connecting said passive element to a positive side or a negative side of said power converter according to said command; and said driving controller includes command means for issuing said command to said active element in accordance with the position of said target operating point and the result of a judgment in the judgment means when the target operating point is on the power driving side and so that a conduction path passing through said passive element is formed between said battery and said power converter when the target operating point is on the regeneration side and when said permanent magnet type synchronous motor is to be started.

* * * * *